United States Patent
Imamura (10) Patent No.: US 12,416,606 B2
(45) Date of Patent: Sep. 16, 2025

(54) LIQUID CHROMATOGRAPHY ANALYSIS SYSTEM

(71) Applicant: SHIMADZU CORPORATION, Kyoto (JP)

(72) Inventor: Shinya Imamura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 458 days.

(21) Appl. No.: 17/924,996

(22) PCT Filed: Jan. 8, 2021

(86) PCT No.: PCT/JP2021/000477
§ 371 (c)(1),
(2) Date: Nov. 12, 2022

(87) PCT Pub. No.: WO2021/250919
PCT Pub. Date: Dec. 16, 2021

(65) Prior Publication Data
US 2023/0184723 A1 Jun. 15, 2023

(30) Foreign Application Priority Data
Jun. 9, 2020 (JP) ................................ 2020-100123

(51) Int. Cl.
*G01N 30/32* (2006.01)
(52) U.S. Cl.
CPC ....... *G01N 30/32* (2013.01); *G01N 2030/326* (2013.01)

(58) Field of Classification Search
CPC .................... G01N 30/32; G01N 2030/326
See application file for complete search history.

(56) References Cited

FOREIGN PATENT DOCUMENTS

| JP | 62-132442 U | 8/1987 |
|---|---|---|
| JP | 2006-313093 A | 11/2006 |
| JP | 2007-074820 A | 3/2007 |

OTHER PUBLICATIONS

Machine translation of JP 2006-313093. Espacenet. (Apr. 9, 2025).*
Bissig, H., et al., "Primary standards for measuring flow rates from 100 nl/min to 1 ml/min—gravimetric principle", Biomed. Eng.—Biomed. Tech., 60, 4, pp. 301-316. (Year: 2015).*

(Continued)

*Primary Examiner* — Benjamin L Lebron
(74) *Attorney, Agent, or Firm* — Renner, Otto, Boisselle & Sklar, LLP (57) ABSTRACT

An LC system includes a liquid delivery checker configured to execute a liquid delivery check mode of setting a predetermined flow rate to a liquid delivery pump and operating the liquid delivery pump at a timing different from analysis of a sample in order to check a liquid delivery flow rate of the liquid delivery pump, and a measuring instrument for measuring an amount of a mobile phase delivered by the liquid delivery pump during the liquid delivery check mode. The liquid delivery checker is configured to obtain an actual measurement value of a flow rate of a mobile phase when operating the liquid delivery pump by setting the predetermined flow rate to the liquid delivery pump using a measurement value obtained by the measuring instrument in the liquid delivery check mode.

6 Claims, 5 Drawing Sheets

(56) References Cited

OTHER PUBLICATIONS

Chromatography Forum, "Flow rate accuracy". (Dec. 20, 2005).*
Kohn, R., "How to check pump system accuracy for HPLC analysis", Tovatech. (Jul. 17, 2019).*
International Search Report for corresponding Application No. PCT/JP2021/000477, mailed Mar. 30, 2021.
Written Opinion for corresponding Application No. PCT/JP2021/000477, mailed Mar. 30, 2021 (English machine translation).

* cited by examiner

LIQUID CHROMATOGRAPHY ANALYSIS SYSTEM

TECHNICAL FIELD

The present invention relates to a liquid chromatography analysis system.

BACKGROUND ART

In an analysis system such as a liquid chromatography analysis system (hereinafter, an LC system), it is recommended to periodically execute validation for checking whether or not each function of the analysis system is normal in order to improve reliability of analysis. Validation in an LC system includes various items such as accuracy check of a detector (see Patent Document 1).

Among validation items of an LC system, accuracy check of a detector and the like are automated, but some items are not automated. One of non-automated validation items is check of a liquid delivery flow rate of a liquid delivery pump. The liquid delivery pump basically performs calculation using a correlation (design value) between a feeding amount of a plunger of a plunger pump and a liquid delivery flow rate, and adjusts an operation speed of the plunger so that a calculated liquid delivery flow rate becomes a set flow rate, and generally does not perform control based on an actual measurement value of a flow rate of a mobile phase. In particular, in applications where analysis is performed in a wide flow rate range such as several μL/min to several hundred μL/min, since there is no flowmeter capable of measuring a mobile phase flow rate with high accuracy in such a wide range, it is impossible to perform feedback control of a liquid delivery flow rate by a liquid delivery pump on the basis of an actual measurement value. For this reason, it is necessary to periodically perform validation of flow rate check of a liquid delivery pump.

Validation for checking a liquid delivery flow rate is generally performed by setting a flow rate in a liquid delivery pump as a set flow rate, delivering a predetermined mobile phase such as water, the user measuring an amount of a mobile phase delivered for a certain period of time, calculating an actual liquid delivery flow rate from the amount, and comparing an actual measurement value of the amount with a set flow rate.

PRIOR ART DOCUMENT

Patent Document

Patent Document 1: Japanese Patent Laid-open Publication No. 2007-074820

SUMMARY OF THE INVENTION

Problems to be Solved by the Invention

As described above, validation for checking a liquid delivery flow rate of a liquid delivery pump is not automated, which hinders full automation of accuracy check of each function of an LC system.

The present invention has been made in view of the above problem, and an object of the present invention is to provide an LC system capable of automatically performing check of a liquid delivery flow rate of a liquid delivery pump.

Solutions to the Problems

An LC system according to the present invention includes a liquid delivery pump that delivers a mobile phase, the liquid delivery pump operating to set a liquid delivery flow rate of a mobile phase to a set flow rate based on a pre-designed correlation between an operation speed and a liquid delivery flow rate, an autosampler that injects a sample into a mobile phase downstream of the delivery pump, a separation column for separating components in a sample downstream of the autosampler, a detector for detecting the components separated in the separation column downstream of the separation column, a liquid delivery checker configured to execute a liquid delivery check mode of setting a predetermined flow rate to the liquid delivery pump and operating the liquid delivery pump at a timing different from analysis of a sample in order to check a liquid delivery flow rate of the liquid delivery pump, and a measuring instrument for measuring an amount (including weight and a flow rate) of a mobile phase delivered by the liquid delivery pump during the liquid delivery check mode. The liquid delivery checker is configured to obtain an actual measurement value of a flow rate of a mobile phase when operating the liquid delivery pump by setting the predetermined flow rate to the liquid delivery pump using a measurement value obtained by the measuring instrument in the liquid delivery check mode.

Effects of the Invention

In the present invention, since the liquid delivery checker that executes the liquid delivery check mode and the measuring instrument that measures an amount of a mobile phase delivered during the liquid delivery check mode are provided, it is possible to automatically check a liquid delivery flow rate of the liquid delivery pump.

EMBODIMENTS OF THE INVENTION

Hereinafter, an embodiment of an LC system according to the present invention will be described with reference to the drawings.

Figure 1:
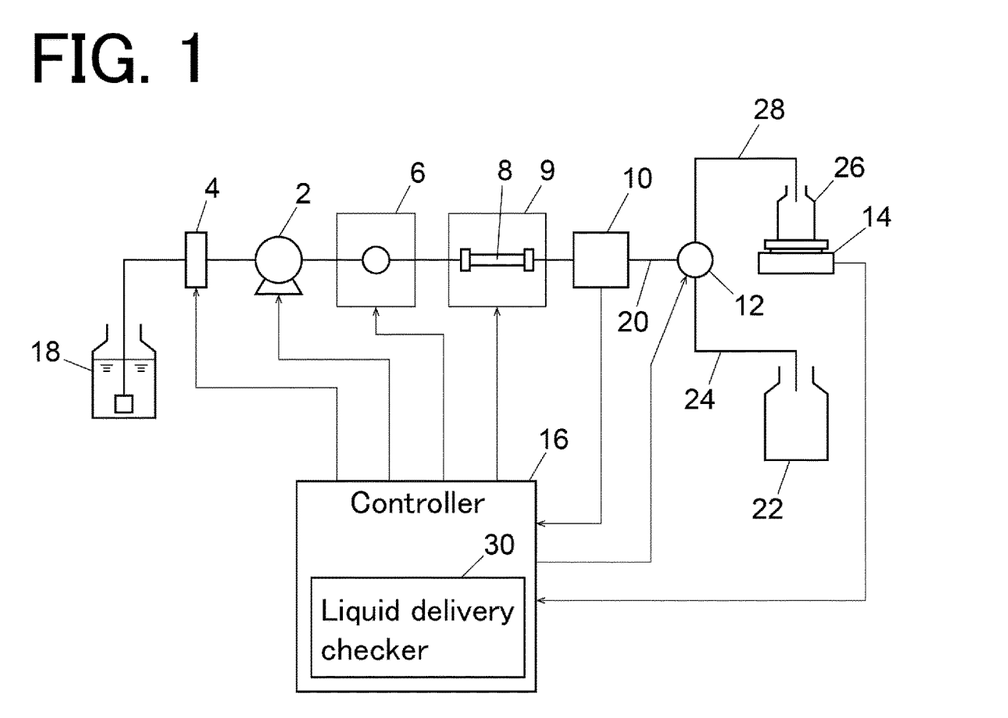
FIG. 1 is a schematic configuration diagram illustrating an embodiment of an LC system.

FIG. 1 illustrates an embodiment of the LC system.

The LC system of the present embodiment includes a liquid delivery pump 2, a degassing device 4, an autosampler 6, a separation column 8, a column oven 9, a detector 10, a switching valve 12, a weight meter 14, and a controller 16.

The liquid delivery pump 2 is provided to pump a mobile phase from a mobile phase container 18 and deliver the mobile phase. The liquid delivery pump 2 is configured by a plunger pump, and is configured to deliver a mobile phase of a set flow rate by calculating an operation speed of a plunger necessary for setting a liquid delivery flow rate to a set flow rate using a correlation designed in advance between an operation speed of the plunger and a liquid delivery flow rate and operating the plunger on the basis of the calculated value.

The degassing device 4 is provided on a flow path for pumping up a mobile phase from the mobile phase container 18 by the liquid delivery pump 2. The degassing device 4 is for degassing a mobile phase pumped up from the mobile phase container 18 by the liquid delivery pump 2.

The autosampler 6 is fluidly connected downstream of the liquid delivery pump 2, and is configured to automatically inject a sample into a mobile phase delivered by the liquid delivery pump 2.

The separation column 8 is fluidly connected downstream of the autosampler 6, and is for separating components in a sample injected by the autosampler 6. The separation column 8 is accommodated in the column oven 9 in which internal temperature can be controlled at set temperature.

The detector 10 is fluidly connected downstream of the separation column 8 and is for detecting a component in a sample separated in the separation column 8.

The switching valve 12 switches a connection destination of an outlet flow path 20 of the detector 10 between a waste liquid flow path 24 leading to a waste liquid collection container 22 and a collection flow path 28 leading to a collection container 26. The switching valve 12 can be realized by a three-way solenoid valve, a rotary valve, or the like. The switching valve 12 is normally in a state (normal state) in which the outlet flow path 20 is connected to the waste liquid flow path 24, and is in a state (liquid delivery check state) in which the outlet flow path 20 is connected to the collection flow path 28 only in a liquid delivery check mode to be described later.

The weight meter 14 is for measuring weight of the collection container 26. The weight meter 14 constitutes a measuring instrument for measuring an amount of a mobile phase delivered by the liquid delivery pump 2 during the liquid delivery check mode to be described later. The weight meter 14 has measurement accuracy of about 1 mg and a measurement range of about 200 g.

The controller 16 is for managing operation of the liquid delivery pump 2, the degassing device 4, the autosampler 6, the column oven 9, and the switching valve 12, and is realized by a dedicated computer or a general-purpose personal computer including a central processing unit (CPU) and an information storage device. The controller 16 is provided with a liquid delivery checker 30. The liquid delivery checker 30 is a function obtained by a CPU executing a program.

The liquid delivery checker 30 is a function of automatically executing validation for checking a liquid delivery flow rate of the liquid delivery pump 2. An example of operation of the LC system realized by the liquid delivery checker 30 will be described with reference to a flowchart of FIG. 2.

Figure 2:
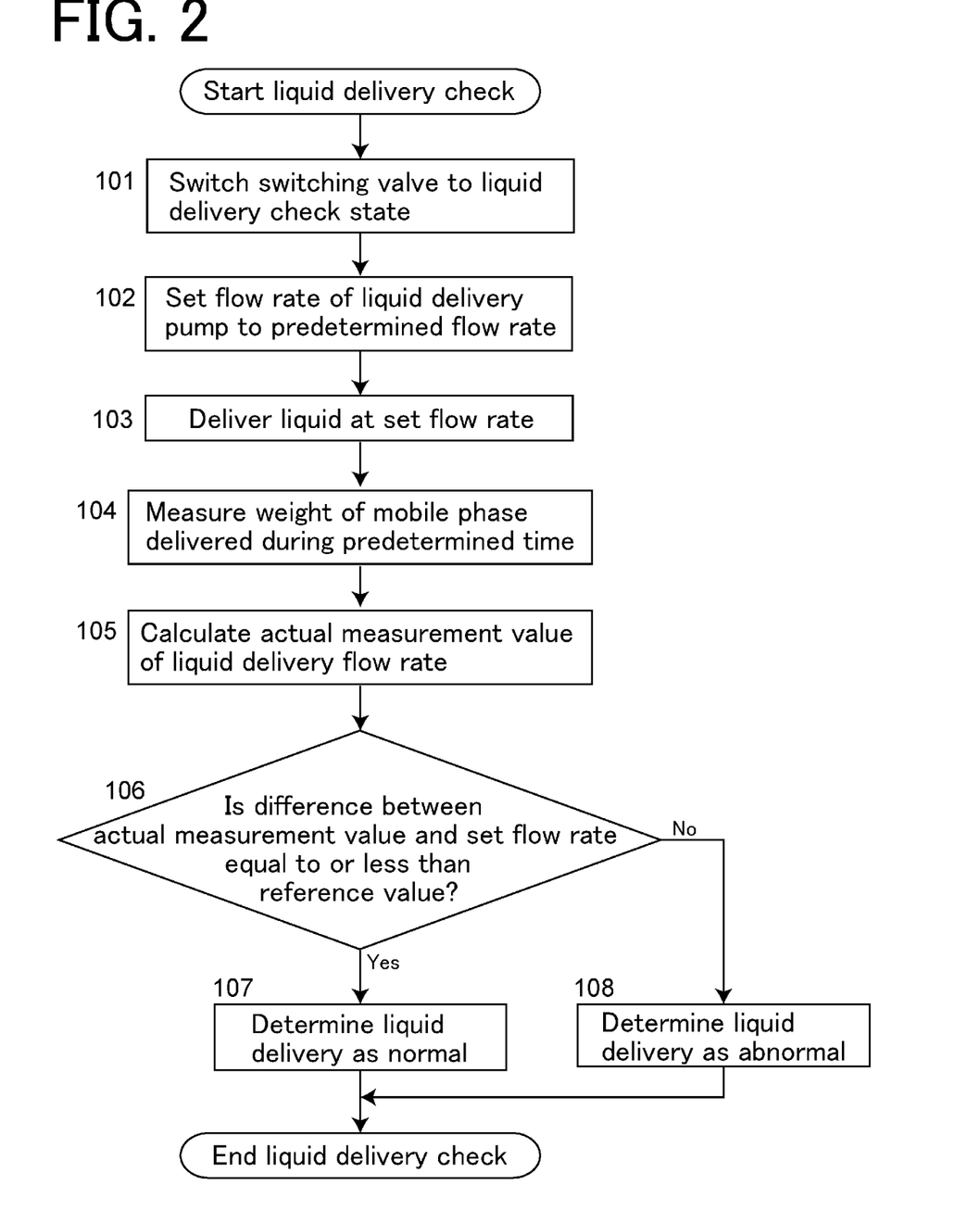
FIG. 2 is a flowchart for explaining operation in a liquid delivery check mode of the embodiment.

When the user inputs an instruction to perform validation for checking a liquid delivery flow rate of the liquid delivery pump 2 to the controller 16, the liquid delivery checker 30 executes the liquid delivery check mode and switches the switching valve 24 from the normal state to the liquid delivery check state (Step 101). Furthermore, the liquid delivery checker 30 sets a set flow rate of the liquid delivery pump 2 to a predetermined flow rate for liquid delivery check (Step 102), and causes the liquid delivery pump 2 to deliver a predetermined mobile phase (for example, water) at the set flow rate (Step 103).

In a state where the liquid delivery pump 2 is delivering liquid at a set flow rate, the liquid delivery checker 30 measures weight of a mobile phase delivered by the liquid delivery pump 2 for predetermined time (for example, one minute) based on a weight change of the collection container 26 measured by the weight meter 14 (Step 104), and calculates an actual liquid delivery flow rate (actual measurement value) by the liquid delivery pump 2 using the measured weight and specific gravity of the mobile phase (Step 105). The liquid delivery checker 30 takes a difference between the actual measurement value obtained by calculation and a predetermined flow rate (set flow rate of the liquid delivery pump 2) and compares (an absolute value of) the difference value with a preset reference value (for example, 5% of a predetermined flow rate) to evaluate liquid delivery accuracy of the liquid delivery pump 2 (Step 106). If the difference value between the actual measurement value and the predetermined flow rate is equal to or less than the reference value, it is determined as "normal" (Step 107), and if the difference value between the actual measurement value and the predetermined flow rate exceeds the reference value, it is determined as "abnormal" (Step 108). A determination result is displayed on, for example, a display electrically connected to the controller 16.

Figure 3:
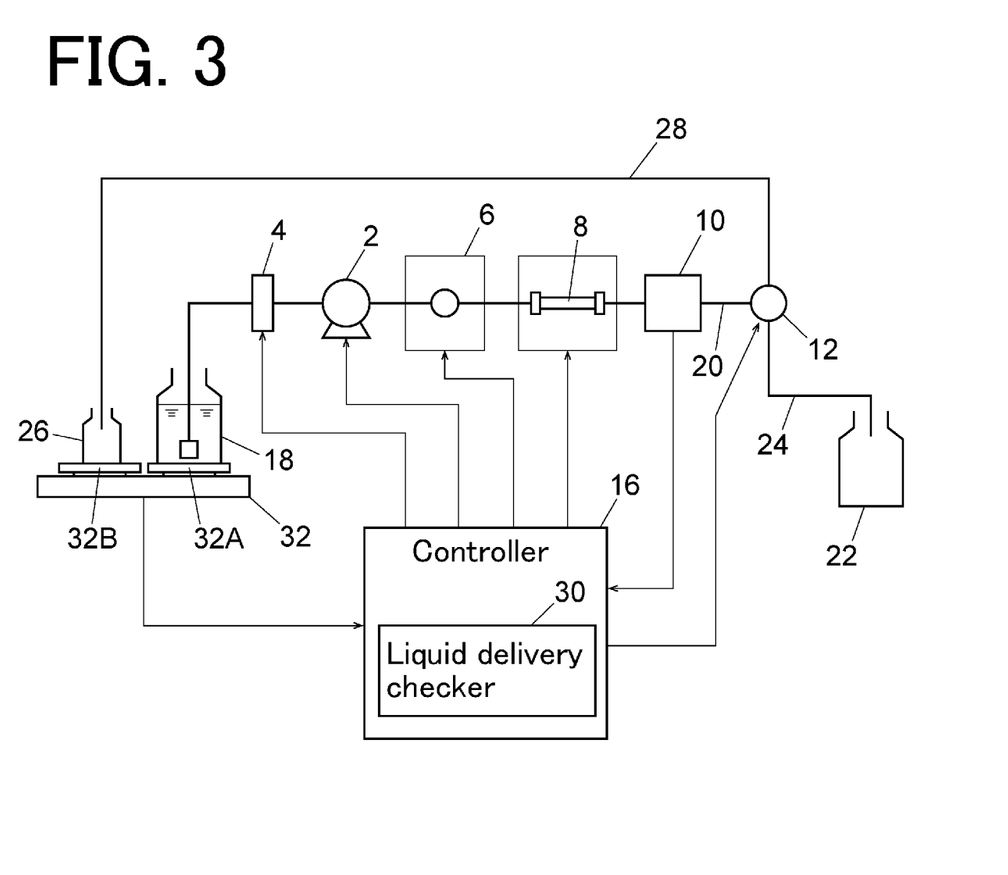
FIG. 3 is a schematic configuration diagram illustrating another embodiment of the LC system.

Note that, in the present embodiment, the dedicated weight meter 14 is provided as a measuring instrument that measures weight of a mobile phase delivered during the liquid delivery check mode, but in a case where a weight measuring apparatus 32 for monitoring a remaining amount of a mobile phase in the mobile phase container 18 is provided as illustrated in FIG. 3, weight of the collection container 26 may be measured in one weight measurement cell 32B of the weight measuring apparatus 32. In this case, in a weight measurement cell 32A for measuring weight of the mobile phase container 18, since weight of the mobile phase container 18 having larger capacity than the collection container 26 needs to be measured, a measurement range is designed to be wide. For this reason, when a weight measurement cell having the same design as the weight measurement cell 32A is used for validation of liquid delivery check, measurement accuracy for weight is insufficient when accuracy of liquid delivery at a minute flow rate of several µL/min is checked, and a liquid delivery flow rate cannot be accurately evaluated. Therefore, the weight measurement cell 32B is designed to have higher measurement accuracy and a narrower measurement range than the weight measurement cell 32A.

Figure 4:
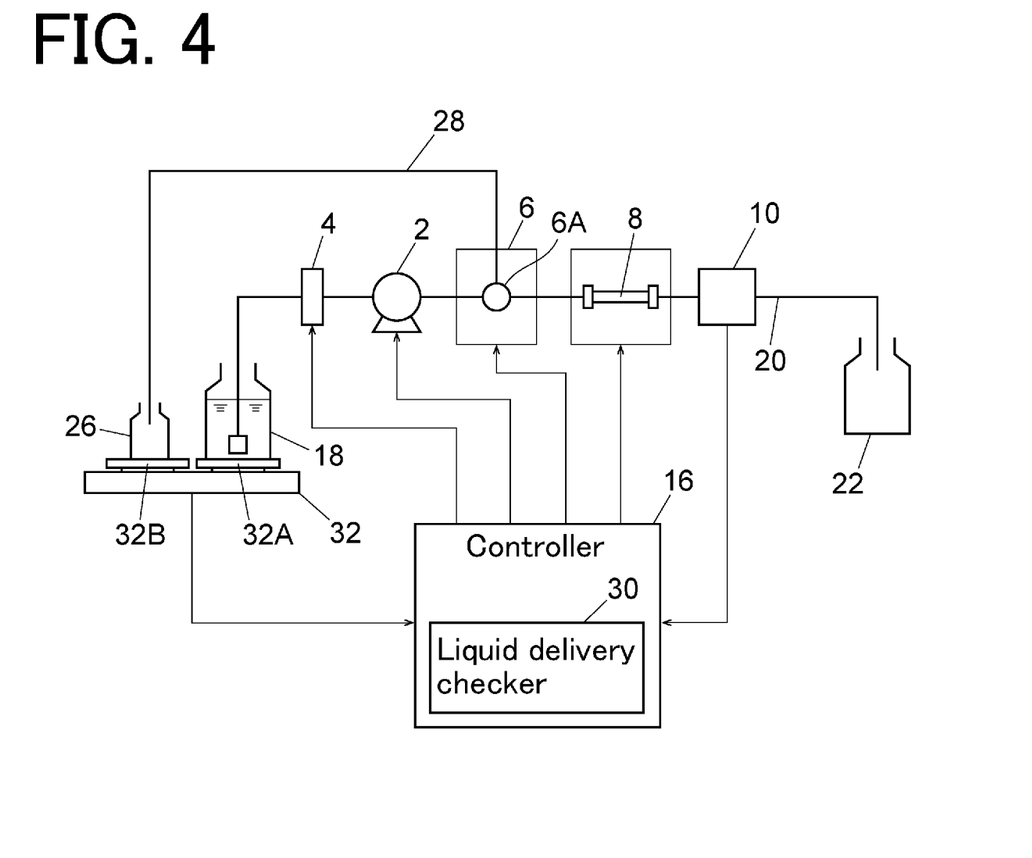
FIG. 4 is a schematic configuration diagram illustrating still another embodiment of the LC system.

Further, in the embodiment described above, a function of guiding a mobile phase delivered by the liquid delivery pump 2 to the collection container 26 only during the liquid delivery check mode is realized by the switching valve 14 provided downstream of the detector 10, but a switching valve having such a function may be provided at any position as long as the position is downstream of the liquid delivery pump 2. In the embodiment illustrated in FIG. 4, a function of guiding a mobile phase delivered by the liquid delivery pump 2 to the collection container 26 only during the liquid delivery check mode is realized by a high-pressure valve 6A provided in the autosampler 6.

Figure 5:
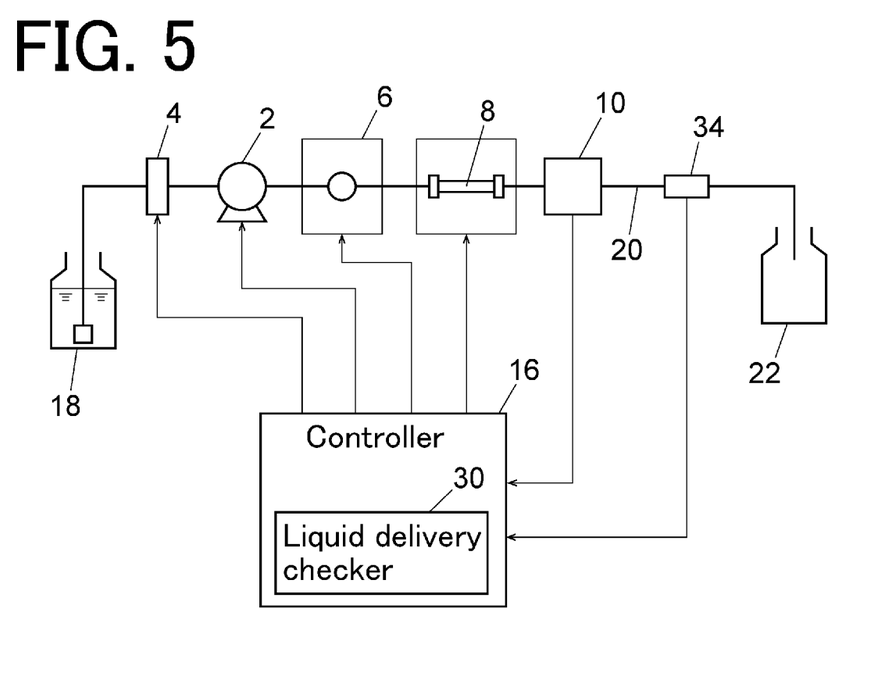
FIG. 5 is a schematic configuration diagram illustrating still another embodiment of the LC system.

Further, as illustrated in FIG. 5, a flow meter 34 may be provided as a measuring instrument for measuring an amount of a mobile phase delivered by the liquid delivery pump 2 during the liquid delivery check mode. The flow meter 34 has measurement accuracy in the order of µL/min. The flow meter 34 has a measurement range narrower than a flow range used in analysis, and cannot be used for controlling operation of the liquid delivery pump 2. In the embodiment of FIG. 5, the flow meter 34 is provided on the outlet flow path 20 of the detector 10, but may be provided anywhere downstream of the liquid delivery pump 2. However, from the viewpoint of minimizing dead volume upstream of the detector 10, the flow meter 34 is preferably provided downstream of the detector 10.

The embodiment described above is merely an example of an embodiment of the LC system according to the present invention. The embodiment of the LC system according to the present invention is as described below.

An embodiment of the LC system according to the present invention includes a liquid delivery pump that delivers a mobile phase, the liquid delivery pump operating to set a liquid delivery flow rate of a mobile phase to a set flow rate based on a pre-designed correlation between an operation speed and a liquid delivery flow rate, an autosampler that injects a sample into a mobile phase downstream of the delivery pump, a separation column for separating components in a sample downstream of the autosampler, a detector for detecting the components separated in the separation column downstream of the separation column, a liquid delivery checker configured to execute a liquid delivery check mode of setting a predetermined flow rate to the liquid delivery pump and operating the liquid delivery pump at a timing different from analysis of a sample in order to check a liquid delivery flow rate of the liquid delivery pump, and a measuring instrument for measuring an amount of a mobile phase delivered by the liquid delivery pump during the liquid delivery check mode. The liquid delivery checker is configured to obtain an actual measurement value of a flow rate of a mobile phase when operating the liquid delivery pump by setting the predetermined flow rate to the liquid delivery pump using a measurement value obtained by the measuring instrument in the liquid delivery check mode.

A first aspect of the embodiment further includes a collection container for collecting a mobile phase delivered by the liquid delivery pump during the liquid delivery check mode. The measuring instrument is a weight meter for liquid delivery check that measures weight of a mobile phase collected in the collection container.

In the first aspect, the collection container may be connected downstream of the liquid delivery pump via a switching valve, and the switching valve may be configured to be switched when the liquid delivery check mode is executed so that the collection container is connected downstream of the liquid delivery pump.

In the above case, the switching valve may be a high-pressure valve provided in the autosampler. In this manner, it is not necessary to add a new switching valve, and it is possible to suppress increase in an installation area and cost of the LC system.

Further, the first aspect may further include a weight meter for remaining amount measurement, having a wider measurement range than the weight meter for liquid delivery check, that measures weight of a mobile phase container that stores a mobile phase before being delivered by the liquid delivery pump.

In the above case, the weight meter for liquid delivery check and the weight meter for remaining amount measurement can be realized by weight measurement cells different from each other provided in a common weight measuring apparatus.

Further, in a second aspect of the embodiment, the measuring instrument is a flow meter provided downstream of the liquid delivery pump and having a measurement range narrower than a flow rate range of a mobile phase used in analysis of the LC system.

Further, in a third aspect of the embodiment, the liquid delivery checker is configured to determine whether or not liquid delivery of the liquid delivery pump is normal by comparing a difference between the actual measurement value obtained in the liquid delivery check mode and the predetermined flow rate set to the liquid delivery pump in the liquid delivery check mode with a reference value. According to such an aspect, the user can easily recognize whether or not the liquid delivery pump is operating normally. This third aspect can be combined with any one of the first and second aspects described above.

DESCRIPTION OF REFERENCE SIGNS

2: Liquid delivery pump
4: Degassing device
6: Autosampler
6A: High-pressure valve
8: Separation column
9: Column oven
10: Detector
12: Switching valve
14: Weight meter
16: Controller
18: Mobile phase container
20: Outlet flow path
22: Waste liquid container
24: Waste liquid flow path
26: Collection container
28: Collection flow path
30: Liquid delivery checker
32: Weight measuring apparatus
32A, 32B: Weight measurement cell
34: Flow meter

The invention claimed is:

1. A liquid chromatography analysis system comprising:
a liquid delivery pump that delivers a mobile phase, the liquid delivery pump operating to set a liquid delivery flow rate of a mobile phase to a set flow rate based on a pre-designed correlation between an operation speed and a liquid delivery flow rate;
an autosampler that injects a sample into a mobile phase downstream of the delivery pump;
a separation column for separating components in a sample downstream of the autosampler;
a detector for detecting the components separated in the separation column downstream of the separation column;
a liquid delivery checker configured to execute a liquid delivery check mode of setting a predetermined flow rate to the liquid delivery pump and operating the liquid delivery pump at a timing different from analysis of a sample in order to check a liquid delivery flow rate of the liquid delivery pump; and
a measuring instrument for measuring an amount of a mobile phase delivered by the liquid delivery pump during the liquid delivery check mode, wherein
the liquid delivery checker is configured to obtain an actual measurement value of a flow rate of a mobile phase when operating the liquid delivery pump by setting the predetermined flow rate to the liquid delivery pump using a measurement value obtained by the measuring instrument in the liquid delivery check mode,
the liquid chromatography analysis system further comprising a collection container for collecting a mobile phase delivered by the liquid delivery pump during the liquid delivery check mode, the measuring instrument is a weight meter for liquid delivery check that measures weight of a mobile phase collected in the collection container, and the liquid chromatography analysis system further comprising a weight meter for remaining amount measurement, having a wider measurement range than the weight meter for liquid delivery check, that measures weight of a mobile phase container that stores a mobile phase before being delivered by the liquid delivery pump.

2. The liquid chromatography analysis system according to claim 1, wherein the collection container is connected downstream of the liquid delivery pump via a switching valve, and the switching valve is switched when the liquid delivery check mode is executed so that the collection container is connected downstream of the liquid delivery pump.

3. The liquid chromatography analysis system according to claim 2, wherein the switching valve is provided in the autosampler.

4. The liquid chromatography analysis system according to claim 1, wherein the weight meter for liquid delivery check and the weight meter for remaining amount measurement are realized by weight measurement cells different from each other provided in a common weight measuring apparatus.

5. The liquid chromatography analysis system according to claim 1, wherein the liquid delivery checker is configured to determine whether or not liquid delivery of the liquid delivery pump is normal by comparing a difference between the actual measurement value obtained in the liquid delivery check mode and the predetermined flow rate set to the liquid delivery pump in the liquid delivery check mode with a reference value.

6. A liquid chromatography analysis system comprising:

a liquid delivery pump that delivers a mobile phase, the liquid delivery pump operating to set a liquid delivery flow rate of a mobile phase to a set flow rate based on a pre-designed correlation between an operation speed and a liquid delivery flow rate;

an autosampler that injects a sample into a mobile phase downstream of the delivery pump;

a separation column for separating components in a sample downstream of the autosampler;

a detector for detecting the components separated in the separation column downstream of the separation column;

a controller configured to control operation of the liquid delivery pump and the autosampler, and to execute a liquid delivery check mode of setting a predetermined flow rate to the liquid delivery pump and operating the liquid delivery pump at a timing different from analysis of a sample in order to check a liquid delivery flow rate of the liquid delivery pump;

a collection container for collecting a mobile phase delivered by the liquid delivery pump during the liquid delivery check mode;

a waste liquid container provided downstream of the detector;

a switching valve configured to switch the destination of the mobile phase from the delivery pump between the collection container and the waste liquid container; and a weight meter for liquid delivery check that measures weight of a mobile phase collected in the collection container, wherein the controller is configured to obtain an actual measurement value of a flow rate of a mobile phase when operating the liquid delivery pump by setting the predetermined flow rate to the liquid delivery pump using a measurement value obtained by the weight meter in the liquid delivery check mode, the liquid chromatography analysis system further comprising a weight meter for remaining amount measurement, having a wider measurement range than the weight meter for liquid delivery check, that measures weight of a mobile phase container that stores a mobile phase before being delivered by the liquid delivery pump.

* * * * *